Nov. 7, 1961   L. E. ANDERSON ET AL   3,007,722
HEATING CONDUIT SPLICE
Filed Nov. 13, 1956

INVENTOR.
LEROY E. ANDERSON
HILAIRE F. ST. MARIE
BY
Williamson, Schroeder,
Adams + Meyers
ATTORNEYS United States Patent Office 3,007,722
Patented Nov. 7, 1961

3,007,722
HEATING CONDUIT SPLICE
Leroy E. Anderson and Hilaire F. St. Marie, Detroit Lakes, Minn., assignors to "Snappy," Inc., Detroit Lakes, Minn., a corporation of Minnesota
Filed Nov. 13, 1956, Ser. No. 621,881
1 Claim. (Cl. 285—419)

This invention relates to devices for connecting free end portions of heating conduits when they meet in order to preclude the escape of heat therefrom.

In the installation of heating systems in homes and other buildings, it frequently occurs that the free end portions of heating conduits must be connected or spliced or joined in order to insure proper communication therebetween without the loss of hot air therefrom. For example, the hot air pipes frequently are installed within a home and these pipes must later be connected to the free end portions of the pipe which carries the hot air away from the plenum chamber of the oil burner or other source of heat generation. In such a situation, there is need for a joint or splice which will connect the two adjacent free end portions of the pipes and which will primarily preclude the escape of hot air while positively engaging the end portions of these pipes to hold the connection firm and which can be applied or removed quickly and easily. Most such joints as heretofore known fail in one or more of these respects and one reason for this is because of the variations in diameter which are found in such pipes which causes a loose fit when most joint members are applied. Our invention is directed toward overcoming these disadvantages.

It is a general object of our invention to provide a novel and improved heating conduit splice of simple and inexpensive construction and design and increased efficiency.

Another object is to provide a novel and improved heating conduit splice which effectively compensates for variations in diameter of sections of pipes to be joined and at the same time hold them firmly in connected relation.

Another object is to provide a novel and improved heating conduit splice which will effectively and efficiently preclude the escape or loss of hot air despite variations in the diameters of the sections of pipes to be joined.

Another object is to provide a novel and improved heating conduit splice constructed and designed to more effectively seal off the interior of the pipes to be joined from the exterior atmosphere and to provide a sealed joint connection therebetween.

Another object is to provide a novel and improved heating conduit splice which is unusually simple in construction and design and which can be quickly and easily applied or removed.

These and other objects and advantages of my invention will more fully appear from the following description made in connection with the accompanying drawings, wherein like reference characters refer to the same or similar parts throughout the several views, and in which.

Figure 1:
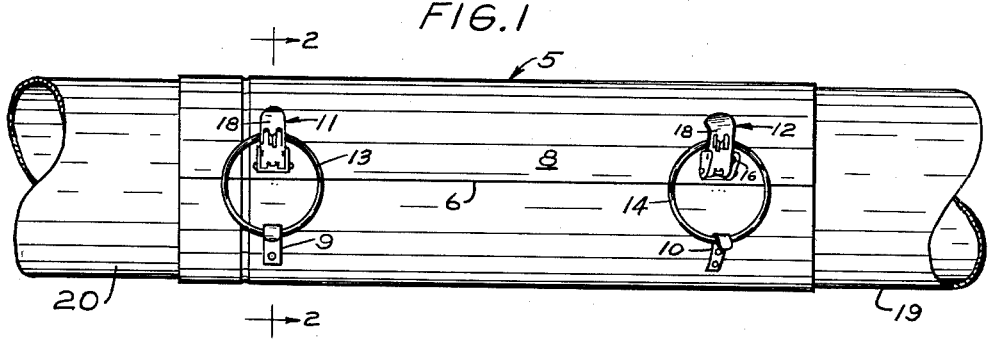
FIG. 1 is a plan view of one embodiment of our invention applied to the free ends of two pipes and joining the same to preclude the escape of hot air therefrom and to cause one to communicate with the other.
Figure 2:
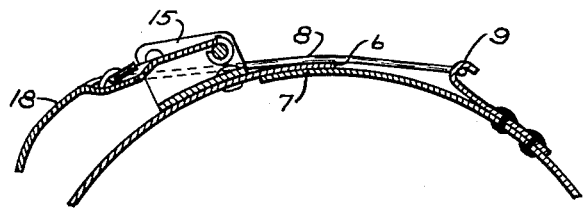
FIG. 2 is a sectional view taken along line 2—2 of FIG. 1.

One embodiment of our invention may include, as shown in FIGS. 1-4, an elongated tubular member 5 which is formed of rigid but resilient material such as galvanized tin. This tubular member 5 is split longitudinally along a line as defined by the edge 6, as shown in FIG. 1. The tubular member 5, as best shown in FIG. 2, has overlapping sealing portions 7 and 8 which extend longitudinally of the tubular member along the split thereof. Mounted on the innermore portion 7 is a pair of longitudinally spaced hook members 9 and 10. These hook members or engaging members 9 and 10 extend outwardly from the tubular member 5 as best shown in FIG. 2.

Mounted on the other of the overlapping portions 8, which is the outermost of the two sealing portions 7 and 8, is a pair of clamps indicated generally as 11 and 12. These clamps 11 and 12 are each positioned opposite one of the hooks 9 and 10 as best shown in FIG. 1. Each of the clamps and hooks together comprise tensioning means for a pair of round, resilient wire loops 13 and 14. Each of these loops or links 13 and 14 is adapted to be engaged by one of the hook members 9 and 10, as best shown in FIG. 2.

Figure 3:
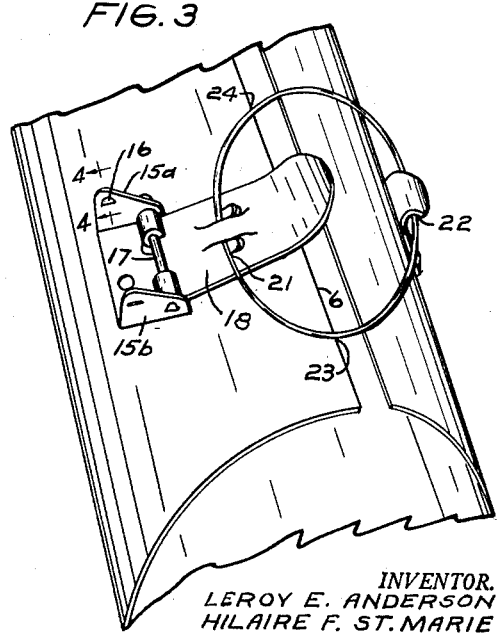
FIG. 3 is a perspective view of one of the connecting mechanisms showing the loop member being applied to the hook member preparatory to completing the splice.
Figure 4:
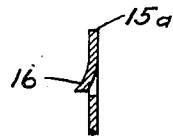
FIG. 4 is a sectional view taken along line 4—4 of FIG. 3.

Each of the clamps 11 and 12 includes a mounting bracket 15 which is mounted on the overlapping portion 8 and extends upwardly or outwardly therefrom. The mounting bracket 15 is generally U-shaped and has a pair of upstanding walls 15a and 15b, each of which has a locking or keeper ear extending inwardly therefrom. These locking or keeper ears 16 are formed by a portion of the metal of the upstanding wall being struck inwardly, as best shown in FIG. 4. Mounted in the upstanding walls 15a and 15b is a pivot pin 17. Pivotally mounted on this pivot pin 17 is a latch member 18, as best shown in FIG. 3. This latch member 18 is free to swing toward and away from the hook member which is disposed opposite thereof.

Each of the latch members 18 carries one of the loops or links 13 and 14 and is swingable toward its hook member to permit engagement thereof by the loop or link, as is best shown in FIG. 3. It is also swingable away from its hook member to place the loop under tension so as to tend to stretch it circumferentially of the tubular member. When the latch member 18 is swung away from the hook members and locked in position by the keepers 16, the loop is thereby maintained under tension.

To apply our heating conduit splice, the loops or links 13 and 14 are swung free of the hook members 9 and 10 and the tubular member may then be slid on to one of the free end portions of the pipe such as 19 and then its opposite end may be slid on to the free end portions of the other heating conduit pipe such as 20. The loops 13 and 14 are then swung over the hooks 9 and 10 and the latch members 18 are then swung away from the hook members to the position shown in FIG. 1 so that ears 16 will engage the latch members and keep them in that position so that the loops will be under constant tension. When under such tension, opposite portions of the loops engage the edge 6 at points spaced longitudinally of the tubular member 5 and press this edge 6 downwardly or inwardly against the innermore overlapping portion 7 to perfect a seal along the length of the edge 6. It should be noted that the pressure is applied at the edge of the overlapping portion 8.

It should be noted that the loops 13 and 14, when not under tension, extend in a single plane. However, when these loops are tensioned as a result of the latches 18 being swung away from the hook members 9 and 10 and retained in that position by the keepers 16, the portions of the ring which connect it to the latch member and the hook member, as indicated at 21 and 22, are distorted out of that plane and are brought into a plane separate from the plane of a tangent to the tubular member at the edge 6. The plane of each such portion is disposed radially inwardly relative to the plane of the tangent so that the edge 6 is constantly urged inwardly to maintain a perfect seal along that edge.

It should also be noted that each of the rings 9 and 10 engage the edge 6 with portions thereof as at 23 and 24 which are spaced longitudinally of the edge 6. In other words, the ring bears against the edge at two spaced points in order to better provide a perfect seal.

Our heating conduit splice has a number of distinct advantages. One of these advantages is that it has better sealing properties even though the pipes to be joined are of identical diameters because the seal is more perfect in view of the fact that the pressure is applied at the edge of the overlapping portion and at spaced points therealong. As a result, we have found that a better seal is provided.

Another advantage of our heating conduit splice is that a better seal is provided when the diameters of the two pipes to be joined, such as the pipes 19 and 20, vary. A better seal is provided because the resilient rings 13 and 14 allow for variations in the diameters of these pipes and because of the resilient nature of these rings, a snug connection is always maintained at the edge 6. The resistance of the rings 13 and 14 to bending out of its general plane keeps the edge 6 pressed inwardly against the innermore overlapping portion and its resistance to elongation circumferentially of the tubular member 5 insures that the portion of the splice which engages the pipe is at the same diameter as that of the conduit pipe to which it is secured.

It should also be noted that our heating conduit splice is unusually simple in construction and design and can therefore be manufactured at a relatively low cost. It also can be applied quickly and easily and insures at the same time, a more complete seal against loss of hot air. In addition our heating conduit splice can be installed and locked in place by hand without the use of any tools such as screwdrivers, pliers, hammers, or specially designed tools.

It will, of course, be understood that various changes may be made in the form, details, arrangement and proportions of the various parts without departing from the scope of our invention.

What is claimed is:

A heating conduit splice comprising a tubular member split longitudinally and made of rigid but resilient material and having overlapping sealing portions extending longitudinally thereof along its split, an outwardly opening hook member mounted on one of said sealing portions and extending outwardly therefrom, a latch member swingably mounted by one of its end portions upon the other of said sealing portions opposite said hook member and swingable toward and away from said hook member, and a resilient generally circular and continuously formed loop secured to a portion of said latch member removed outwardly from its axis of swinging movement and extending transversely of said tubular member across the outer side of said overlapping portion and engaging said hook member and bearing, when tensioned, against the outermost of said overlapping portions and causing the same to cooperatively seal with the innermore overlapping portion the interior of said tubular member from the exterior, and keeper means for positively retaining said latch member in position to extend away from said hook member, said latch member and said hook member and said loop being constructed and arranged so that intermediate portions of said loop bear against said sealing portions only and the portions of said loop which are engaged by said hook member and said latch member are brought into planes separate from its intermediate portion when said latch member extends away from said hook member and tensions said loop.

References Cited in the file of this patent
FOREIGN PATENTS

| | | |
|---|---|---|
| 672,987 | Dick | July 4, 1899 |
| 685,851 | Kifer and Sindorf | Nov. 5, 1901 |
| 839,498 | Millar | Dec. 25, 1906 |
| 969,160 | Hardy | Sept. 6, 1910 |
| 1,122,844 | Andrews | Dec. 29, 1914 |
| 1,470,196 | Ruhmann | Oct. 9, 1923 |
| 1,912,114 | Allen | May 30, 1933 |
| 2,482,558 | Scaringella | Sept. 20, 1949 |

FOREIGN PATENTS

| | | |
|---|---|---|
| 13,567 | Great Britain | June 10, 1912 |